United States Patent
Zhodzishsky

(10) Patent No.: US 11,750,519 B2
(45) Date of Patent: Sep. 5, 2023

(54) DYNAMIC PROXY OPERATIONS IN WIRELESS MESH NETWORKS

(71) Applicant: Cypress Semiconductor Corporation, San Jose, CA (US)

(72) Inventor: Victor Zhodzishsky, Potomac, MD (US)

(73) Assignee: Cypress Semiconductor Corporation, San Jose, CA (US)

( * ) Notice: Subject to any disclaimer, the term of this patent is extended or adjusted under 35 U.S.C. 154(b) by 106 days.

(21) Appl. No.: 17/205,855

(22) Filed: Mar. 18, 2021

(65) Prior Publication Data

US 2022/0303218 A1    Sep. 22, 2022

(51) Int. Cl.
| | | |
|---|---|---|
| *H04L 47/122* | (2022.01) | |
| *H04L 47/125* | (2022.01) | |
| *H04L 67/561* | (2022.01) | |
| *H04W 8/04* | (2009.01) | |

(52) U.S. Cl.
CPC .......... *H04L 47/122* (2013.01); *H04L 47/125* (2013.01); *H04L 67/561* (2022.05); *H04W 8/04* (2013.01)

(58) Field of Classification Search
None
See application file for complete search history.

(56) References Cited

U.S. PATENT DOCUMENTS

| | | | |
|---|---|---|---|
| 8,848,558 B1* | 9/2014 | Martin | H04W 40/02 370/252 |
| 2017/0034772 A1* | 2/2017 | Purohit | H04W 48/16 |
| 2018/0288563 A1* | 10/2018 | Krzych | H04W 4/027 |
| 2019/0037419 A1* | 1/2019 | Knaappila | H04W 40/12 |
| 2019/0075540 A1* | 3/2019 | Liou | G01S 11/06 |
| 2020/0018819 A1* | 1/2020 | Beck | G05D 1/0287 |
| 2020/0245287 A1* | 7/2020 | Nelson | G01S 5/0036 |
| 2021/0195373 A1* | 6/2021 | Geiger | H04W 4/029 |
| 2022/0044319 A1* | 2/2022 | Amicangioli | G06Q 20/027 |

* cited by examiner

*Primary Examiner* — Jonathan A Bui

(57) ABSTRACT

Implementations disclosed describe techniques and systems that improve connectivity and reduce network traffic and interference in wireless mesh networks by maintaining various mesh network devices (proxy nodes, beacon devices, printers, and the like) in an operating mode in which the mesh network devices do not advertise their presence to client devices. An outside client device seeking connection to mesh network devices, transmits a solicitation to the mesh network. Having received a solicitation, a mesh network device responds with one or more announcements (proxy node announcement, location beacon announcement, printer announcement, and so on). In response to receiving solicitations from one or more mesh network devices, the client device performs an action, such as selecting and establishes a proxy connection or a printer connection, determining a current location of the client device, or initiating some other action.

20 Claims, 8 Drawing Sheets

DYNAMIC PROXY OPERATIONS IN WIRELESS MESH NETWORKS

TECHNICAL FIELD

The disclosure pertains to wireless networks; more specifically, to optimization of interactions of client proxy devices (end devices) with wireless mesh networks for improved network performance.

BACKGROUND

A wireless mesh network has an architecture that does not have a rigid hierarchical structure of nodes (devices connected to the network). In a mesh network, data transmission is resilient with respect to a local loss of connectivity between any two nodes as the data can flow (or be rerouted) over multiple paths and though different nodes. In a Bluetooth Low Energy (BLE) mesh network, data typically flows over all available node-to-node connections (flood model) with built-in constraints designed to prevent data from circulating in the network indefinitely and/or travelling between the same nodes multiple times. If a connection between two nodes is temporarily impeded (as a result of interference or changed conditions in the environment), data can still be delivered from a source node to a destination node via various other intermediate nodes. In Thread or ZigBee mesh networks, data is delivered via designated router nodes (routing model) rather than over all possible connections, thus reducing some redundancy of data flows. When a router becomes disabled, another device, from a pool of router-eligible devices, is designated as a router and takes place of the disabled router, thus restoring the integrity of the network. Mesh networks are often deployed in various environments where multiple (often low-power and battery-powered) devices are joined in a network, such as a lighting system of a smart home.

DETAILED DESCRIPTION

Figure 1A:
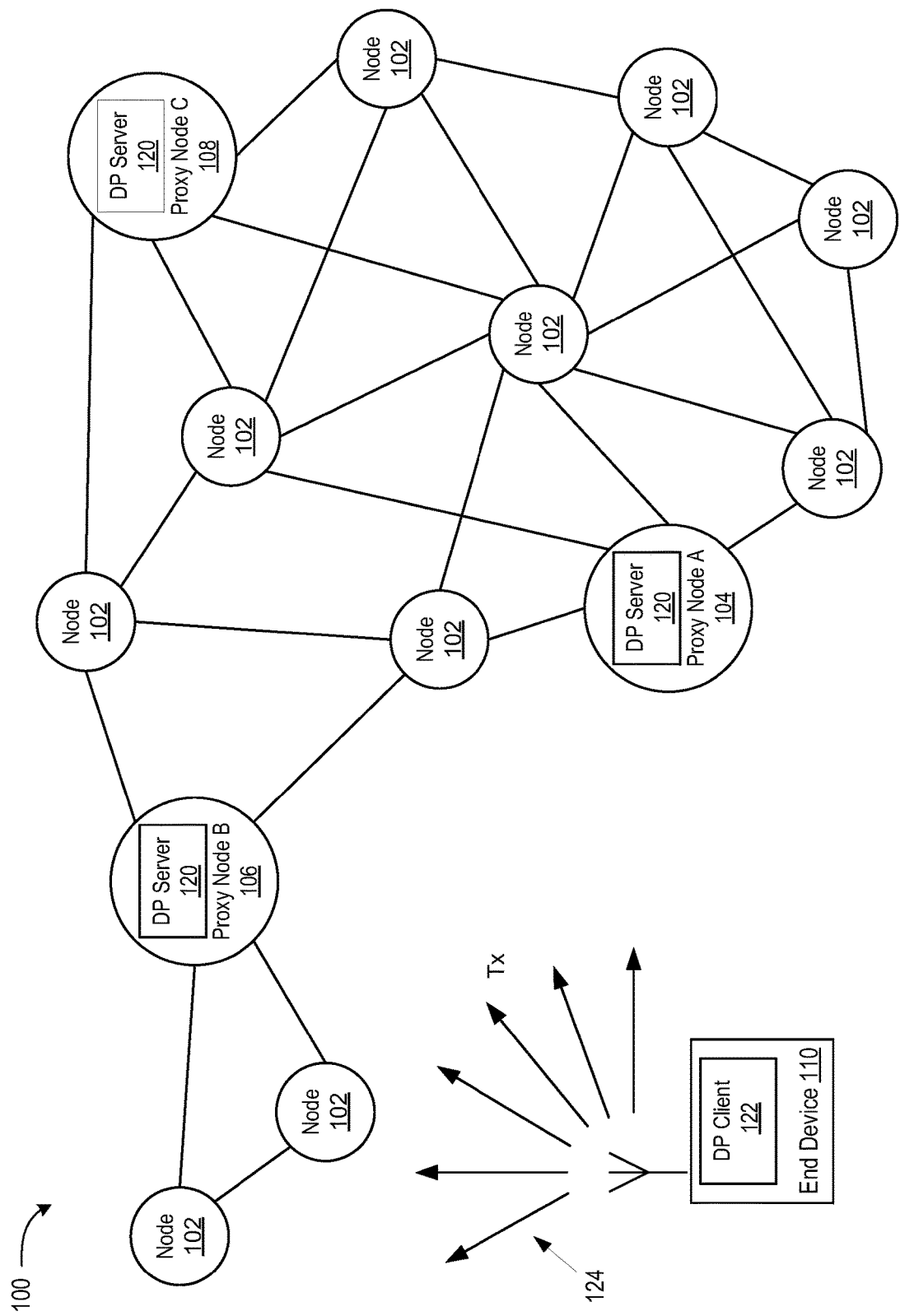
FIG. 1A illustrates one exemplary implementation of a wireless mesh network capable of supporting dynamic proxy operations, in accordance with some implementations.

Resilience and flexibility of mesh networks come with certain overhead costs, such as a significant activity of the networks in a radio domain, including periodic broadcast of advertising signals of advertising signals by various nodes (devices) of the networks. Such advertising helps to maintain association of the nodes with a network and facilitates connectivity of other devices, which are not a part of the network, to the network. For example, a smart home or office may include a mesh network with dozens of nodes, which may be smart lighting devices, heating and air conditioner controllers, door locks, garage door openers, appliances, printers, security system sensors, and so on. Nodes may broadcast advertising bearers to maintain mesh network connectivity. Upon approaching the smart home, a user (e.g., a home owner) may need to connect a smart phone, a smart watch, or a similar end device (client device) to the mesh network of the home. The end device, however, may not be capable of integrating directly into the mesh network. For example, the end device may lack a physical layer (PHY) or a Link Layer capable of supporting mesh network connectivity (e.g., over the IEEE 802.15.4 protocol or BLE mesh advertising bearer). To enable connection of such a device, the mesh network may have a number of the nodes designated as proxy nodes that have a dual functionality. The proxy nodes can serve as regular nodes for passing data within the network and may, additionally, facilitate connectivity of non-network end devices with the network. For example, in a BLE mesh network, various proxy nodes may transmit periodic Generic Attribute Profile (GATT) proxy wireless advertisements (GATT bearers). A non-network end device, client device, client proxy device (hereinafter collectively termed "end device") may receive a GATT proxy advertising (or any other similar type of a proxy communication) from one or more proxy nodes and establish a proxy connection with the proxy node. The established proxy connection allows the end device to receive data from the mesh network, and to configure or otherwise deploy various nodes of the network, including opening or closing garage or home doors, turning on lights, adjusting heating or air conditioning settings, and the like. Because a mesh network may need to support multiple end devices (e.g., wearable devices of multiple home inhabitants or office workers), multiple proxy nodes may have to transmit persistent proxy advertisements. Consequently, the radio band utilized by the mesh network (e.g., 2.4 GHz) may be saturated with proxy advertisements which may interfere with other data transfers within the network as well as with other networks, such as wireless local area networks (WLAN) of the same home (or office). In some instances, the mesh network may also be equipped with location beacons (e.g., location beacons of the indoor positioning system) that transmit navigation frames and further contribute to the over-utilization of the bandwidth. Persistent proxy advertisement may also invoke privacy issues. For example, advertisements by proxy device of a collection of sensors attached to a patient's body may inadvertently reveal the location of the patient.

Aspects and implementations of the present disclosure address these and other limitations of the existing technology by enabling systems and methods of dynamic proxy operations. In some implementations, a proxy node of a mesh network operating in accordance with aspects of this disclosure remains silent until an end device transmits a proxy solicitation. The end device may generate the proxy solicitation in response to an application (e.g., a mobile application) performing an action or detecting a condition that triggers the proxy solicitation. For example, a user of the end device may start the smart home application on the user's end device, e.g., a smart phone, a tablet, a smart watch, or another wearable device. As another example, the end device may generate proxy solicitations at regular time intervals or automatically when the end device is in a proximity of the network, e.g., near a home, office, as may be determined from geolocation data, based on the time of day (e.g., when the user is expected to be at home or in the office), or in some other way.

FIG. 1A illustrates one exemplary implementation of a wireless mesh network 100 capable of supporting dynamic proxy operations, in accordance with some implementations. Wireless meth network 100 may be a BLE Mesh network, a Thread Mesh network, a ZigBee Mesh network, or any other type of a mesh network. Mesh network 100 may include any number of nodes 102 configured to pass data to other nodes. Mesh network 100 may also include a number of proxy nodes configured to pass data to other nodes as well as to connect to end devices that lack the mesh network functionality and, therefore, are incapable of operating as one of the nodes 102. Depicted are three proxy nodes: proxy node A 104, proxy node B 106, and proxy node C 108, but any number of proxy nodes may be supported by mesh network 100. A node or a proxy node may be any device supporting the mesh network connectivity and functionality (e.g., receiving, sending, and relaying data), such as a desktop computer, a laptop computer, a tablet, a phone, a smart TV, a sensor, a lighting device, an appliance, a controller (e.g., an air conditioning, heating, water heating controller), a lock, a component of a security system, a location beacon, or any other type of mesh network devices. The terms "node" and "proxy node" should also be understood as denoting any devices having a similar functionality in any mesh network regardless of the specific or proprietary term that is used for the respective device. For example, in relation to ZigBee and Thread mesh networks the term "proxy node" may denote routers of the respective networks, or any other devices capable of relaying data from/to end devices.

A node may be designated a proxy node to provide connectivity to end devices, e.g., end device 110. While one end device is depicted in FIG. 1A for conciseness, any number of end devices 110 may be present. Proxy nodes may include a dynamic proxy server (DPS) 120 which may be a module (e.g., a software, firmware, hardware component, or any combination thereof) to perform dynamic proxy operations as described herein. End device 110 may include a dynamic proxy client (DPC) 122 which may be a similar (to DPS 120) module implementing client-side functionality in the communications between, e.g., proxy A 104 ("proxy server") and end device 110 ("proxy client"). In accordance with implementations of this disclosure, settings of DPS 120 on one or more proxy nodes of mesh network 100 may indicate that the respective node is to maintain silence, as a default configuration. For example, upon powering up, proxy node A 104 may access a dynamic proxy selector value stored in memory (e.g., non-volatile memory) of proxy node A 104 and determine (e.g. by a central processing unit (CPU) or any other logic device of proxy node A 104) that the proxy selector value is set to a first value (e.g., "1") corresponding to ACTIVE dynamic proxy. Responsive to determination of the first value, proxy node A 104 may be set (by the CPU) not to transmit proxy advertisements until a proxy solicitation from an end device is first detected. Likewise, if upon accessing that the dynamic proxy selector has a second value (e.g., "0"), the CPU can configure proxy node A 104 as INACTIVE and broadcast proxy solicitations at regular time intervals.

If the dynamic proxy mode is selected as ACTIVE for all proxy nodes of wireless mesh network 100, end device 110 entering a radio reception range of the network may not detect advertisements from proxy nodes of the network. Instead, an application (not depicted in FIG. 1A) on end device 110, e.g., a smart home control application, a navigation application, a printing application, etc., may take an action triggering establishment of a connection with mesh network 100. In particular, the application may cause DPC 122 to begin transmitting proxy solicitations. Specifically, DPC 122 may generate proxy solicitation data packets that may include an identifier (ID) of end device 110, a target network to which end device 110 is attempting to connect, and other data. A link layer (or a media access control (MAC) layer) of end device 110 may transform proxy solicitation data packets into proxy solicitation frames and provide the frames for further processing to a PHY layer and broadcasting proxy solicitations by radio (as depicted by arrows 124). The transmitted proxy solicitation frames may include identification of a network to which end device 100 attempts to connect (e.g., network 100). The transmitted proxy solicitation frames may also include IP addresses and/or MAC addresses of end device 110 and various other information (e.g., metadata) that may be used in processing of proxy solicitations by proxy nodes. Data transmitted in proxy solicitation frames may be cryptographically protected with the network's security material (e.g., symmetric or asymmetric keys, digital certificates, and so on). In some implementations, end device 110 may optionally continue broadcasting proxy solicitations at regular time intervals.

Figure 1B:
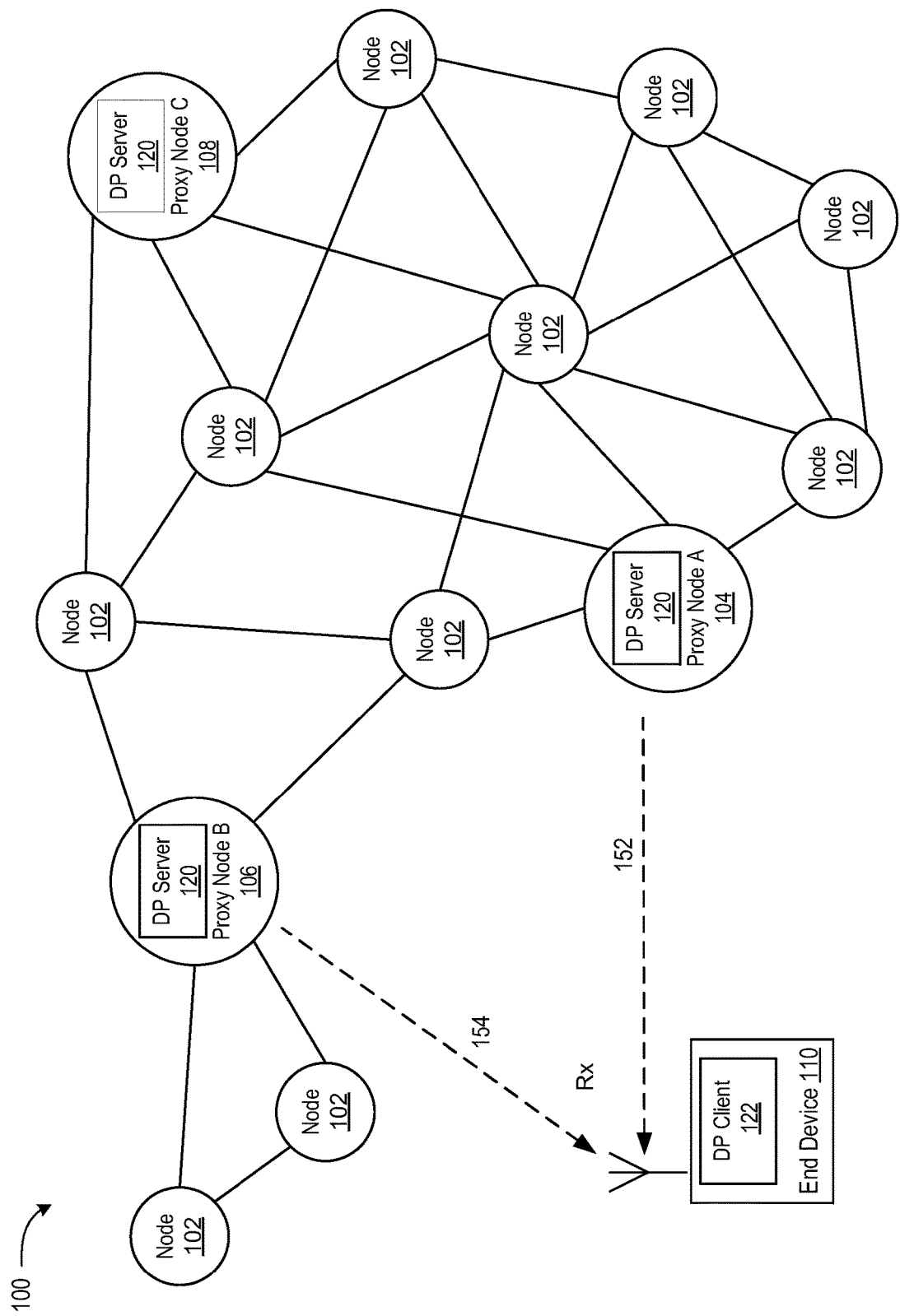
FIG. 1B illustrates dynamic proxy announcements by proxy nodes of the wireless mesh network of FIG. 1A, in accordance with some implementations.

FIG. 1B illustrates dynamic proxy announcements by proxy nodes of the wireless mesh network 100 of FIG. 1A, in accordance with some implementations. Upon detecting proxy solicitations transmitted by end device 110, one or more proxy nodes that are located within a reception distance from end device 110 may respond with proxy announcements. For example, proxy node A 104 may respond with proxy announcement 152 and proxy node B 106 may respond with proxy announcement 154 (as depicted with dashed arrows). Specifically, proxy node A 104 may receive proxy solicitation frames using radio and PHY layer of proxy node A 104 and transform the received frames into proxy solicitation packets using link layer of proxy node A 104. A CPU (or any other processing logic) of proxy node A 104 executing operations of DPS 120 may determine, from the data included in the proxy solicitation packets, that end device 110 is requesting a connection to the mesh network. In response, the CPU of proxy node A 104 may prepare one or more proxy announcement packets, the link layer of proxy node A 104 may transform the packets into proxy announcement frames, which may be transmitted by PHY layer/radio of proxy node A 104 as one or more proxy announcements 152 to end device 110. In some implementations, transmission of one or more proxy announcements may be contingent upon DPS 120 recognizing that end device 110 is an authorized device, e.g., by verifying that the ID of end device 110 received with the proxy solicitation is on a recognized list of authorized devices. The list of authorized devices may be stored in a non-volatile memory of proxy node A 104 (e.g., as a lookup table). In some implementations, proxy node A 104 transmits proxy announcement(s) 152 regardless of the identity of end device 110 whereas the actual authentication of end device 110 is performed later, when a wireless connection between end device 110 is being established, as described later in relation to FIG. 3.

Similarly, any number of proxy nodes may respond to proxy solicitations by end device 110. For example, responsive to receiving a proxy solicitation, proxy node B 106 may transmit proxy announcement(s) 154. As shown schematically with a graph 150, multiple proxy announcement signals (e.g., 152 and 154) may be received (RX) by end device 110. The signals may arrive at different times, e.g., proxy A announcement 152 may arrive at time $T_A$ and proxy B announcement 154 may arrive a later time $T_B$ ($T_B>T_A$). Received proxy announcements, in addition to the information about their respective arrival times $T_A$ and $T_B$, may carry various additional data (e.g., packaged in data frames of the proxy announcements). The additional data may include all or some of the following:

(i) a type of the proxy node device, such as a door lock, a light bulb, a smart controller, a printer, and the like;

(ii) a power mode of the proxy node device, e.g., a grid-powered device (for example, a light bulb), a rechargeable battery-powered device (for example, a door lock powered by a solar-rechargeable battery), a device powered by a non-rechargeable battery (for example, a button-cell-powered sensor), and so on;

(iii) a current network load of the proxy node, including a number of other end devices supported by the proxy node, an average number of other nodes linked to the proxy node over a pre-determine period of time (e.g., one minute, ten minutes, etc.), an average amount of wireless traffic through the node, in bytes per second, frames per second, and so on;

(iv) a transmission power (TX power) or a similar indicator of the strength of the wireless radio signal that the node is configured to transmit;

(v) a location of the proxy node, which may be in absolute coordinates, e.g., in global positioning system (GPS) coordinates, latitude/longitude/elevation, etc., or relative to various local reference markers, such as a floor/level number, a distance from (and a direction to) a certain reference point of the floor/level, and the like. The above examples are illustrative and do not exhaust all possible types of data that may be included in proxy announcements communicated by proxy devices.

Based on the time of arrival of various proxy announcements and/or other data included in proxy announcements, DPC 122 may identify a target proxy node (e.g., from the nodes that responded with proxy announcements) to which a connection is to be established. Various information derived from the proxy announcements may be transformed into a set of metrics for determination of the target proxy node. In some implementations, the determination may be performed on the basis of the time of arrival with a proxy node whose proxy announcement arrives first at end device 110 selected as the target proxy node. In some implementations, the determination of the target proxy node may be performed by weighting multiple metrics. Specifically, some or each of the types of data (i)-(v) (or any additional data) may be a basis for one of the metrics to be weighted. For example, a type of the proxy node device may be used as a first metric $M_1$ with $M_1=1$ value assigned to a grid-powered device, $M_1=2$ value assigned to a rechargeable battery-powered device, $M_1=3$ value assigned to a non-rechargeable alkaline battery-powered device, $M_1=4$ value assigned to a non-rechargeable button-cell battery-powered device, and so on. Similarly, value $M_2$ may represent a number of other end devices supported by the proxy device, value $M_3$ may be the average traffic through the proxy node, and so on. Another metric, e.g., $M_4$, may be determined based on the transmission power indicator of the proxy node (received with the proxy announcement) and the actual received signal strength indicator (RSSI) of the signal measured by end device 110. From the transmission power indicator and the RSSI, DPC may determine a distance from the proxy device to end device 110. Accordingly, metric $M_4$ may reflect the determined distance, with smaller values $M_4$ corresponding to closer distances, and larger values $M_4$ corresponding to more remote proxy devices. Metric $M_5$ may be (or be based on) the time of arrival of the proxy announcement (e.g., counted from the time the proxy solicitation is transmitted), measured in appropriate units, e.g., milliseconds. The described metrics are intended for illustration only and practically unlimited number of different metrics may be used instead or in addition to the above metrics, based on the type of the specific network and devices thereof.

The computed, by DPC 122, metrics $M_1$ may be weighted with respective weights $W_1$ to obtain a weighted metric, $$M = \sum_j W_j \cdot M_j.$$

The weighted metric M may be computed for each of the proxy nodes that responded with solicitations. The target device may then be selected based on the weighted metric M. For example, a device with the lowest M (or the highest M depending on the weighting scheme) may be selected as the target proxy device. The weights $W_1$ may be determined based on empirical testing and stored in a non-volatile memory of end device 110. For example, if it is determined during testing that the number of devices supported by the proxy device ($M_2$) and the distance from the end device ($M_4$) are most representative of the reliability and efficiency of the proxy connections, the respective weights $W_2$ and $W_4$ may be set to higher values than other weights. Whereas in the described example the weighted metric is determined using linear weighting, in some implementations, non-linear weighting may be used. In some implementations, the weights $\{W_1\}$ may depend on a type of the end device 110, a type of the application instantiated on the end device, or a type of a task that the end device is to perform using the mesh network.

The advantages of silencing persistent advertising may be quite substantial in mesh networks with a large number of mesh nodes. For example, a node in a conventional network that broadcasts advertisements once every 1 second (cycle) may spend time $t_1$ preparing and transmitting such an advertisement. If there are N nodes in the mesh network, N−1 other nodes may receive the advertisement and spend time $t_2$ processing it. If all N nodes of the mesh network broadcast similar advertisements, a total of $t_1+(N-1)\times t_2$ time per cycle may be spent by each node broadcasting and processing the broadcasts. For a network of N=50 nodes, assuming $t_1=1$ ms to transmit and $t_2=2$ ms to process a received transmission, each node may spend close to 100 ms per cycle, or 10% of the time, on advertising processing. Implementations of the present disclosure allow to reduce significantly the amount of transmission, reception, and processing of such advertisements. This, in turn, helps with reducing power consumption by the network as well as improves the overall efficiency and reliability (by virtue of reducing possible sources of radio interference) of the wireless communications.

Figure 2:
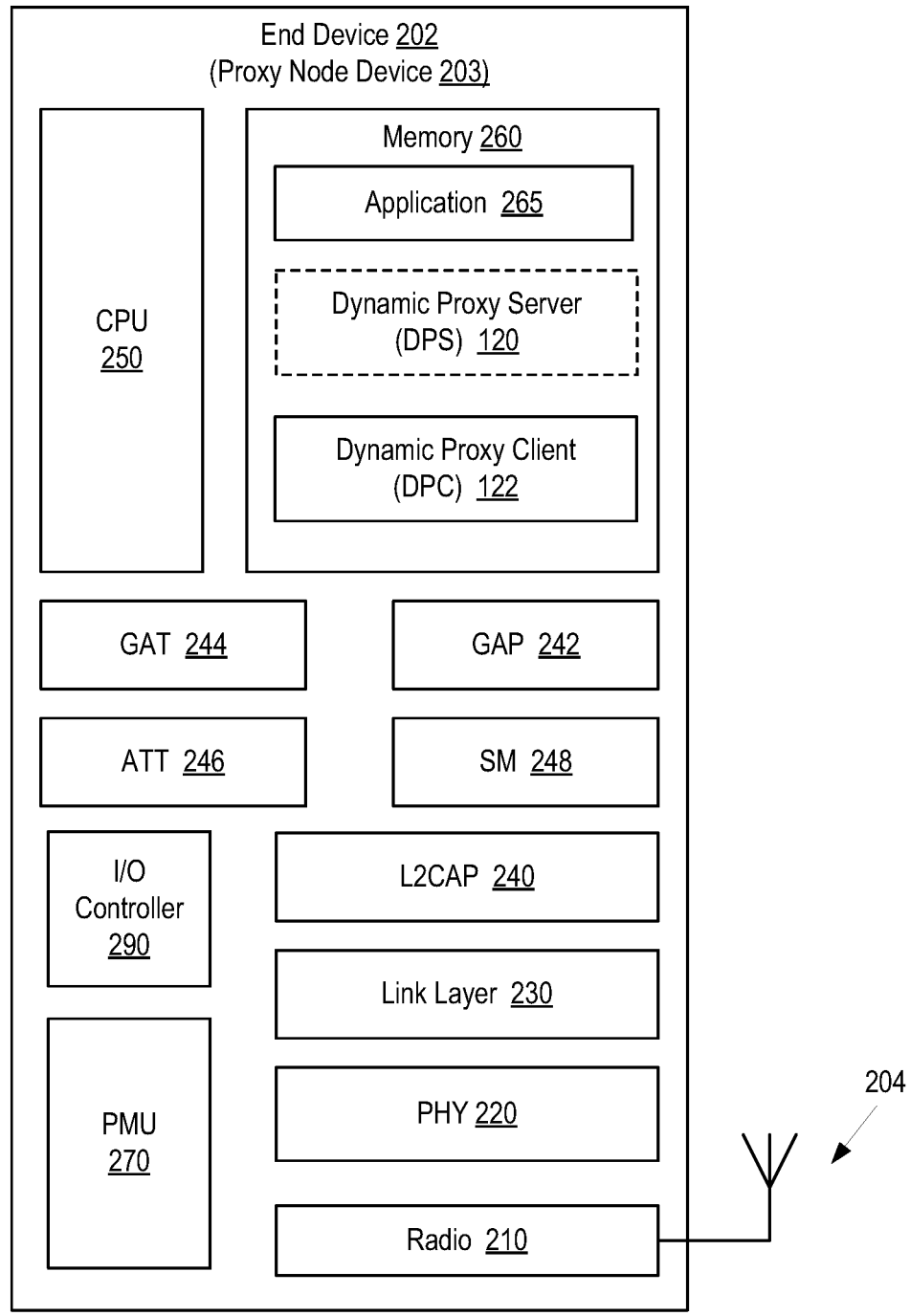
FIG. 2 is a block diagram of one example device capable of supporting dynamic proxy operations in wireless mesh networks, in accordance with some implementations.

FIG. 2 is a block diagram of one example device 200 capable of supporting dynamic proxy operations in wireless mesh networks, in accordance with some implementations. Example device 200 may be an end device 202 (e.g., end device 110 of FIG. 1A and FIG. 1B) or a proxy node device 203 (e.g., proxy node A 104 or proxy node B 106 of FIG. 1A and FIG. 1B) of a wireless mesh network. End device 202 (or proxy node device 203) may be implemented as an integrated circuit (IC) device (e.g., disposed on a single semiconductor die) that provides dynamic proxy functionality, such as transmission (or reception) of proxy solicitations, reception (or transmission) of proxy announcements generated in response to proxy solicitations, evaluation of metrics based on the proxy announcements, selection of a target proxy node for a wireless proxy connection, establishing the wireless proxy connection, receiving and sending data through the established proxy connection, establishing a printer connection, receiving location beacon announcements, determining location of end device 202, and so on. Dynamic proxy operations supported by end device 202 may include proxy operations of any mesh networks, including but not limited to BLE mesh networks, Thread mesh networks, ZigBee mesh networks, and the like. Correspondingly, modules and components of end device 202 (or proxy node device 203) may be operating in accordance with a wireless protocol utilized by the respective mesh network, e.g., IEEE 802.15.4.

End device 202 (or proxy node device 203) may be capable of a wireless connectivity (including simultaneous connectivity) to more than one network, including multiple mesh networks of the same type (e.g., BLE), multiple mesh networks of different types (e.g., both BLE and ZigBee mesh networks), multiple mesh networks and networks of other types (e.g., a mesh network and a WLAN, such as a Wi-Fi® network). For example, end device 202 may be a smart phone capable of connection to a BLE proxy of a smart home BLE mesh network, a WLAN home network, a WLAN office network, and the like. Accordingly, where components and modules of end device 202 (or proxy node device 203) are described in relation to a particular type of a mesh network, it should be understood that similar modules and components may be present on end device 202 (or proxy node device 203) that is connectable to other networks and that some of the modules and components may be shared among multiple networks. In some implementations, the networks may utilize a single radio band (e.g., 2.4 GHz band) or multiple bands (e.g., both 2.4 GHz and 5 GHz bands). End device 202 (or proxy node device 203) may use (or be connected to) one or more antennas 204, to receive and transmit radio waves. Some of antennas 204 may be shared among various networks. In some implementations, a single multi-input multi-output (MIMO) antenna may be used.

A signal received by antenna(s) 204 may be processed by radio module 210 which may include filters (e.g., band-pass filters), low-noise radio-frequency amplifiers, down-conversion mixer(s), intermediate-frequency amplifiers, analog-to-digital converters, inverse Fourier transform modules, deparsing modules, interleavers, error correction modules, scramblers, and other (analog and/or digital) circuitry that may be used to process modulated signals received by antenna(s) 204. Radio module 210 may provide the received (and digitized) signals to a physical layer component (PHY) 220. PHY 220 may convert the digitized signals into frames that can be fed into a Link Layer 230. Link Layer 230 may have a number of states, such as advertising, scanning, initiating, connection, standby. Link Layer 230 may transform frames into data packets. During transmission, data processing may occur in the opposite direction, with Link Layer 230 transforming data packets into frames that are then transformed by PHY 220 into digital signals provided to radio module 210. Radio module 210 may convert digital signals into radio signals and transmit the radio signals using antenna(s) 204. In some implementations, radio module 210, PHY 220, and Link Layer 230 may be implemented as parts of a wireless controller, e.g., a wireless controller implemented as a single integrated circuit.

End device 202 (or proxy node device 203) may include Logical Link Control Adaptation Protocol (L2CAP) 240 which may perform segmentation and reassembly of data packets that are generated by an application that exchanges data with the mesh network, e.g., by application 265. Specifically, L2CAP may segment data packets of arbitrary size, as output by application 265, into packets of the size and format that can be processed by Link Layer 230. L2CAP may also perform error detection operations. End device 202 (or proxy node device 203) may also include generic access profile (GAP) 242 and generic attribute profile (GATT) 244. GAP 242 may specify how end device 202 component to advertise, discover other devices (e.g., proxy devices), and establish wireless connections with the discovered devices. Security manager (SM) 248 may control how pairing, signing, and encryption is to be performed. GATT 244 may specify how a data exchange between end device 202 (or proxy node device 203) and another device (e.g., a proxy device or a printer) is to occur once the connection between the devices is established. GATT 244 may use attribute protocol (ATT) 246 that specifies how units of data are transferred between devices. Other components (not explicitly depicted in FIG. 2) may also be included as part of end device 202 (or proxy node device 203), such as a host-controller interface.

End device 202 (or proxy node device 203) may include one or more CPU 250. In some implementations, CPU 250 may include one or more finite state machines (FSMs), field-programmable gate arrays (FPGAs), application-specific integrated circuits (ASIC), or the like. End device 202 (or proxy node device 203) may have a single processor that executes various operations of dynamic proxy connections together with other processes that may be running on end device 202 (or proxy node device 203). In some implementations, end device 202 (or proxy node device 203) may have a dedicated processor for proxy operations (and other operations related to mesh network connectivity) that is separate from other processes and applications running on end device 202 (or proxy node device 203).

End device 202 (or proxy node device 203) may also include a power management unit (PMU) 270 which may manage clock/reset and power resources. End device 202 (or proxy node device 203) may further contain an input/output (I/O) controller 290 to enable communications with other external devices (including non-mesh network devices) and structures. In some implementations, I/O controller 290 may enable a general purpose I/O (GPIO) interface, a USB interface, a PCM digital audio module, and other I/O components.

End device 202 (or proxy node device 203) may further include a memory device 260, which may be (or include) non-volatile, e.g., read-only (ROM) memory, and volatile, e.g., random-access (RAM), memory. Memory device 260 of end device 202 (or proxy node device 203) may store codes and supporting data for DPC 122 for implementation of dynamic proxy operations on the proxy client side. Similarly, as depicted by the dashed box, memory device 260 of proxy node device 203 may store codes and supporting data for DPS 120 for implementation of dynamic proxy operations on the proxy server side. DPC 122 and/or DPS 120 may perform operations in accordance with the instant disclosure. In some implementations, some of the functions of DPC 122 and/or DPS 120 may be implemented as part of GAP 242.

Figures 3A, 3B:
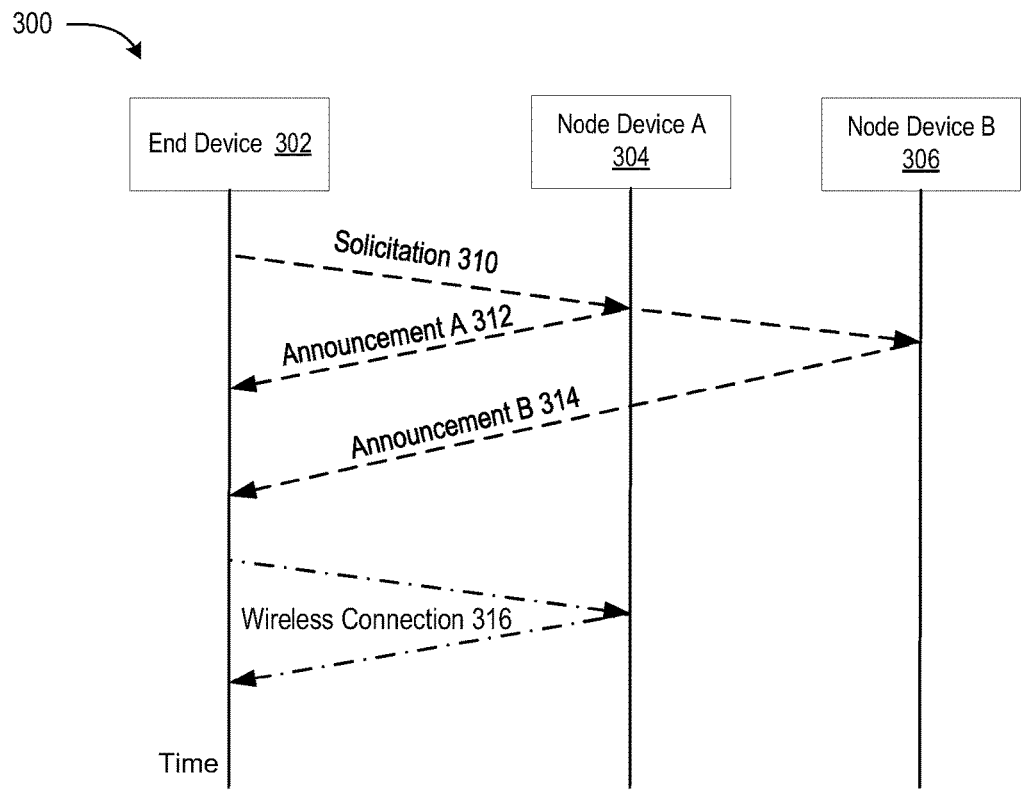
FIG. 3A is an example data exchange between an end device and one or more node devices of a wireless mesh network, in accordance with some implementations.
FIG. 3B is an example illustration of a content of an announcement transmitted, in response to a solicitation from an end device, by one or more node devices of a wireless mesh network, in accordance with some implementations.

FIG. 3A is an example data exchange 300 between an end device and one or more node devices of a wireless mesh network, in accordance with some implementations. Depicted, for conciseness, are an end device 302, node device A 304, and node device B 306, although any other number of node devices (e.g., one, three, etc.) may be present). Node devices 304 and 306 can be proxy devices (for example, devices capable of facilitating data exchanges between end device 302 and any wireless mesh network), devices capable of performing a job (or a series of jobs) at the request of end device 302 (for example, a wireless printer), various beacon devices (for example, location beacon devices), and so on. Node devices A 304 and B 306 may initially listen (instead of advertising their presence) for a special solicitation communication from end devices that attempt to connect to the network. To access the network, an end device 302 (e.g., a wearable device), instead of scanning for advertising communications (or default beacon frames), may initiate the connection process by broadcasting a solicitation 310. In some implementations, solicitation 310 may be encrypted (or otherwise protected by network security measures) to ensure privacy of end device 302. For example, solicitation 310 may be encrypted using a public key that was previously shared with the network or with a network's public or private key previously shared by the network. In some implementations, solicitation 310 may be broadcast by end device 302 in the background (e.g., periodically) even when end device 302 is not near the network (e.g., solicitations may be broadcast by a smart phone even when the user is away from home). In some implementations, solicitation 310 may be broadcast only when end device 302 is within a certain pre-determined area near the network, e.g., when end device 302 is near home/office, as may be determined from GPS coordinates of home/office and the current GPS coordinates of end device 302. In some implementations, solicitation 310 may be broadcast when an application that controls devices in the network starts or when the user performs a certain action with the application, e.g., initiates a change to settings of some of the control devices or begins any other interaction with the control devices.

Solicitation 310 may be implemented in a variety of formats. Currently, BLE mesh networks use mesh beacons, similar to an Unprovisioned Device Beacon (which helps a mesh network provisioner to discover an unprovisioned device) and a Secure Network Beacon (which is used to indicate a security status of a node). Solicitation 310 may be implemented as a new beacon type. Solicitation 310 may have different formats and data content for different networks (e.g., solicitations in Thread mesh networks may be defined differently from BLE mesh networks). In some implementations, solicitation 310 may be transmitted over advertising channels (e.g., specific channels of the radio band that are dedicated to advertising transmissions rather than to data transmissions).

After end device 302 has broadcast solicitation 310, end device 302 may transition to listening for node announcements. Upon receiving solicitation 310, node device A 304, which has previously remained silent, may begin advertising its presence. For example, node device A 304 may transmit announcement 312 indicating that node device A 304 is a proxy device capable of supporting a connection to a non-mesh device. Similarly, announcement 312 may indicate that node device A 304 is a printer device. In some implementations, announcement 312 may indicate that node device A 304 is a location beacon (transmitting, among other data, the beacon's location). Multiple other node devices may similarly respond with announcements, e.g., node device B 306 may respond with announcement 314, which may arrive at end device 302 at a different time than the time of arrival of announcement 312.

End device 302, having received one or more announcements in response to solicitation 310, may perform various operations, which may be contingent on the type(s) of responding node devices. In some implementations, where at least one announcement is from a proxy device, end device 302 may select a target proxy device (if multiple proxy devices have responded with announcements) and establish a wireless connection 316 with the target proxy device. Establishing wireless connection 316 may involve exchanging a series of data communications (as depicted schematically by the dot-dashed lines in FIG. 3A), which may include authentication/association requests, network security data exchanges, and the like. In the instances of multiple announcements from different proxy devices, end device 302 may apply a set of weights to metrics characterizing arrived announcements (and data contained therein) to identify a target proxy device with which a wireless connection is to be established (e.g., as described above in conjunction with FIG. 1A and FIG. 1B). After wireless connection 316 is established, end device 302 and the target proxy device may begin exchanging data packets as in a standard way, e.g., as specified by a respective mesh wireless network connection protocol.

In some implementations, one of the announcements (e.g., announcement B 314) may be from a printer announcement from a printer (e.g., wireless printer). In some implementations, a printer announcement may be generated in response to receiving a special printer solicitation 310. A printer solicitation may include a special field indicating that only printer responses are invited. As a result, devices of other types (e.g., proxy devices, location beacons, etc.) may remain silent whereas printers respond with printer announcements (e.g., as described above). Printer solicitations may be generated in response to a variety of conditions including but not limited to: (i) end device 302 booting up, (ii) end device 302 arriving at a vicinity of a pre-defined geographic location (e.g., near home, office, etc.), (iii) a user starting an application that is capable of spooling printing jobs, (iv) a user selecting a printing job on end device 302, or the like. In some implementations, no special printer solicitations may be defined; instead a printer may respond in the normal course of action (together with other node devices) to a generic solicitation 310; subsequently, end device 302 may select the printer for a wireless connection 316 without broadcasting that end device 302 is seeking a printer connection.

In the instances of multiple announcements from different printers, end device 302 may choose a target printer based on a set of printer metrics, which may include distances to different printers, RSSIs of different printers, current printing queue of different printers, and the like. Various printer metrics may be assigned weights for identification of the optimal target printer with which the wireless connection is to be established (e.g., as described above in conjunction with FIG. 1A and FIG. 1B). In some implementations, printer announcement may include an advertisement of printer's connectivity on a different network (e.g., a WLAN network) and the wireless connection 316 that is subsequently established may be on that different network. To facilitate such a connection of end device 302 with the printer, printer announcement may include an SSID of the printer or a job-specific SSID for the next printing job (or a series of jobs) that end device 302 is to execute on the printer.

In some implementations, some of the received announcements may be from location beacon devices installed to advertise locations (e.g., indoor locations) of the beacons. Such location announcements may enable end device 302 to triangulate its current location based on the data broadcast by the beacons. The broadcast data may include the absolute locations of the beacons (e.g., GPS coordinates of the beacons), some reference locations of the beacons (e.g., relative to a coordinate grid of a building, office floor, home layout, etc.), distance to reference features, or the like. In some implementations, a location announcement may be generated in response to receiving a special location solicitation 310. A location solicitation may include a special field indicating that only location beacon responses are invited. As a result, devices of other types (e.g., proxy devices, printers, etc.) may remain quiet whereas location beacons respond with location announcements. Location solicitations may be generated in response to a variety of conditions including but not limited to: (i) end device 302 booting up, (ii) end device 302 arriving at a vicinity of a pre-defined geographic location (e.g., near home, office, etc.), (iii) a user starting a navigation application, (iv) the navigation application beginning an action that calls for identification of a current location of end device 302, or the like. In some implementations, no special location solicitations may be defined; instead a location beacon may respond in the normal course of action (together with other node devices) to a generic solicitation 310, without end device 302 specifying that location announcements are being sought. Subsequently, end device 302 may identify location announcements by a special field present in the announcements.

FIG. 3B is an example illustration of an information content (payload) 320 of an announcement transmitted, in response to a solicitation from an end device, by one or more node devices of a wireless mesh network, in accordance with some implementations. The announcement whose data load is illustrated in FIG. 3B may be announcement A 312, announcement B 314, or any other announcement. The announcement can be provided by any type of a mesh network device, including but not limited to a proxy node, a printer (or any other device), a location beacon device, and the like. Information content 320 may be prepared by an application executed by a processing device of the mesh network device, packaged into one or more data packets by a Link Layer, transformed into one more data frames by a PHY layer, and transmitted by one or more antennas of the mesh network device. In some implementations, information content 320 may include a network ID 322, which may include security information, e.g., a public key of the mesh network device, a data that identifies the mesh network device as part of the mesh network, and so on. Information content 320 may also include a node type 324, including but not limited to a proxy node, a location beacon, a printer, a sensor, a door lock, a smart home controller, a lighting device, and so on. Information content 320 may also include a transmission power indicator 326 indicating the strength of the wireless radio signal transmitted by the mesh network device. Information content 320 may also include a power mode 328 of the mesh network device, including but not limited to a grid-powered device, a rechargeable battery-powered device, a solar-rechargeable battery-powered device, a non-rechargeable battery-powered device, a button-cell-powered device, and the like. Information content 320 may also include a current network load of the proxy node 330, including a number of other end devices supported by the proxy node, a number of other nodes linked to the proxy node (e.g., averaged over a pre-determine period of time, such as one minute, ten minutes, etc.), wireless traffic through of node, in bytes per second, frames per second, and so on. Information content 320 may further include a location 332 of the node device (e.g., the coordinates of the device, as described above). Information content 320 may further include a network Service Set Identifier (SSID) 334 of the mesh network device, including but not limited to SSID of the device on the mesh network, on a WLAN network, or any other network to which the mesh network device may be connected or capable of being connected.

Figure 4A:
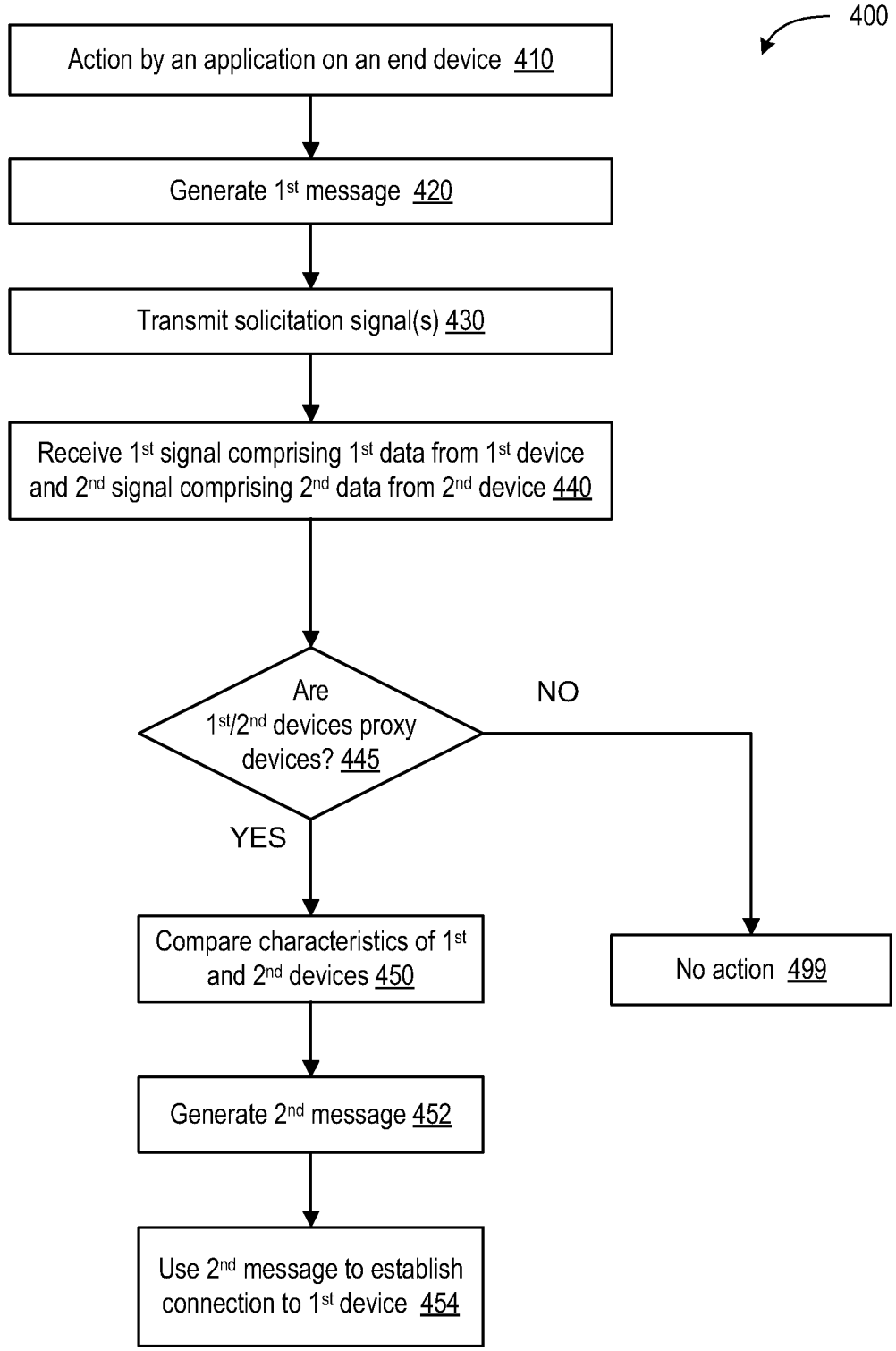
FIG. 4A is a flow diagram of an example method of establishing a connection between an end device and a proxy device of a wireless mesh network, in accordance with some implementations.
Figure 4B:
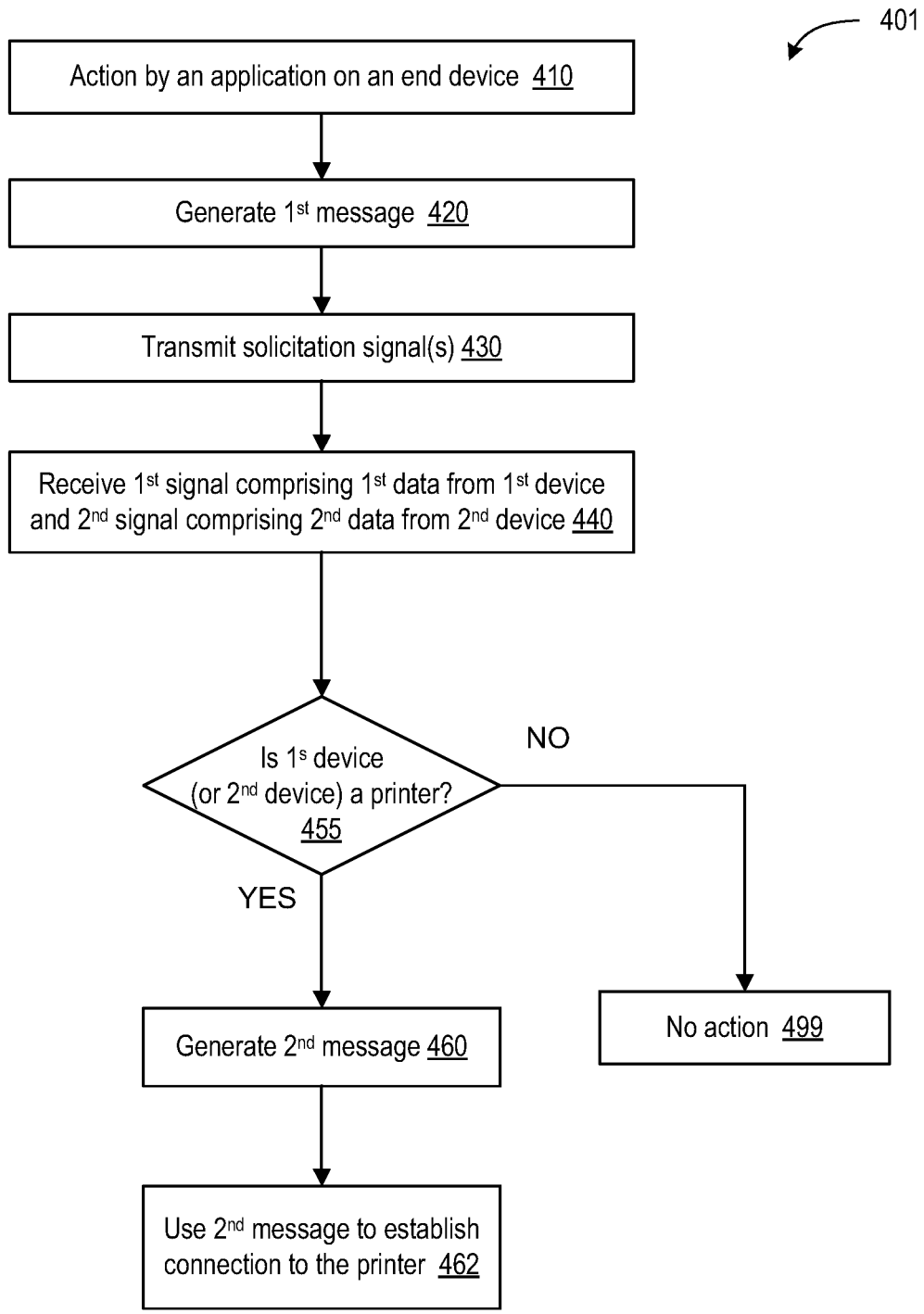
FIG. 4B is a flow diagram of an example method of establishing a connection between an end device and a printer device connected to a wireless mesh network, in accordance with some implementations.
Figure 4C:
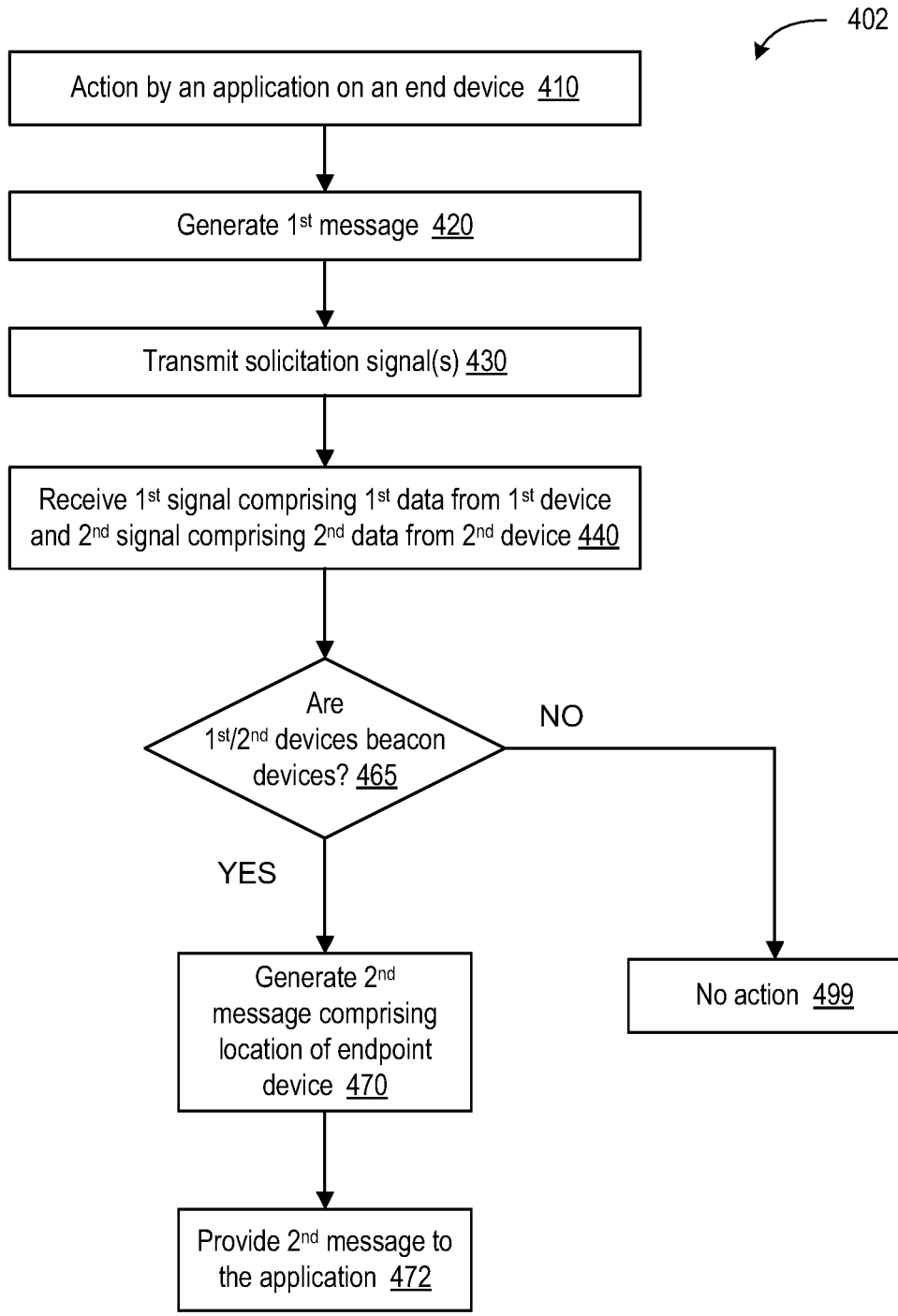
FIG. 4C is a flow diagram of an example method of an interaction of an end device and one or more location beacon devices of a wireless mesh network, in accordance with some implementations.

FIGS. 4A-4C are flow diagrams of example method 400-402 of efficient interaction of an end device with a wireless mesh network, in accordance with some implementations. Methods 400-402 may be performed to establish a wireless connection between an end device and a mesh network proxy device, an end device and a printer, and the like. Methods 400-402 may be performed to identify a location of an end device using one or more location beacons of a mesh network. In some implementations, methods 400-402 may include any combination of these or other operations. Multiple end devices may be performing methods 400-402 in parallel (e.g., concurrently) using the same wireless mesh network.

Methods 400-402 may be performed by a processing logic of an end device interacting with the mesh network. The processing logic performing methods 400-402 may include hardware (e.g., circuitry, dedicated logic, programmable logic, microcode, etc.), firmware, and/or software, or any combination thereof. In some implementations, methods 400-402 may be performed by a processing device, e.g., CPU 250 of end device 202 of FIG. 2, operating in conjunction with a wireless controller of end device 202. The wireless controller may use one or more antennas 204 and may include radio module 210, PHY 220, and Link Layer 230. In some implementations, the processing logic performing method 400 may execute instructions of dynamic proxy client 122 residing in memory device 260 of end device 202. End device may be interacting with various devices of the mesh network, including but not limited to proxy node devices, location beacon devices, printers, and the like. Each of the aforementioned devices (or other devices) may provide a service to the end device, using dynamic proxy server 120, by exchanging communications with the end device, as described herein. In certain implementations, methods 400-402 may be performed by a single processing thread. Alternatively, methods 400-402 may be performed by two or more processing threads, each thread executing one or more individual functions, routines, subroutines, or operations of the method. In an illustrative example, the processing threads implementing methods 400-402 may be synchronized (e.g., using semaphores, critical sections, and/or other thread synchronization mechanisms). Alternatively, the processing threads implementing methods 400-402 may be executed asynchronously with respect to each other. Various operations of methods 400-402 may be performed in a different order compared with the order shown in FIGS. 4A-4C. Some operations of the methods may be performed concurrently with other operations. Some operations may be optional.

FIG. 4A is a flow diagram of an example method 400 of establishing a connection between an end device and a proxy device of a wireless mesh network, in accordance with some implementations. Method 400 may be performed to establish a wireless connection between an end device and a mesh network proxy device. Method 400 may involve an end device running an application capable of facilitating communications with the wireless mesh network. The application may be a smart home or smart office application that is capable of interaction with or controlling operations and settings of various sensors and devices joined into the smart home or office environment. At block 410, the processing logic performing method 400 may execute an action by the application on the end device. For example, the action may be initialization of a wireless connection to a proxy node device, an action to change settings of one or more sensors or controllers of the smart home or office (e.g., to change lighting, heat, ventilation, air conditioning, etc. settings.)

At block 420, method 400 may continue with the processing logic generating a first message in response to the action by the application. The first message may include instructions to the wireless protocol stack (e.g. a software-hardware module that enables wireless communications of the end device) to initialize a wireless transmission to the mesh network. At block 430, processing logic performing method 400 may prepare and transmit, in response to the first message, one or more wireless solicitation signals. The wireless solicitation signals may be configured to communicate to the mesh wireless network that a certain type of service (e.g., a proxy connection, printing service, location service) is requested by the end device.

At block 440, method 400 may continue with the end device receiving one or more signals from devices of the wireless mesh network. In one example implementation, the end device may receive signals from at least two devices, including a first signal transmitted by a first device and a second signal transmitted by a second device. In some implementations, the end device may collect all signals that are received within a predefined (timeout) period and ignore signals received after the expiration of the timeout period. In some implementations, the end device may collect M first signals and ignore other signals. In some implementations, the end device may use a combination of these schemes, e.g. waiting for arrival of M first signals or an expiration of the timeout period, whichever happens first. Any other suitable scheme of collecting multiple received signals may also be implemented. If no signals are received within the timeout period, the end device may repeat block 430 and transmit additional solicitations.

In some implementations, the first received signal may carry a first data and a second received signal may carry a second data. The received signals may be transmitted by the respective devices in response to receiving the one or more wireless solicitation signals broadcast by the end device. In at least some implementations, the first device and the second device are not broadcasting radio signals (which advertise services of the devices) prior to receiving the one or more wireless solicitation signals. It should be understood that "not broadcasting radio signals" does not imply that the first device and the second device has always remained silent prior to receiving the solicitation, and only implies that the first device and the second device have not been broadcasting regular (e.g. periodic) unsolicited advertisements directed at non-network end devices for a certain period of time, for example, since the previous exchange with the same or a different end device. It should further be understood that "not broadcasting radio signals" does not exclude a possibility that the first device and the second device have exchanged various bearers or data between themselves or with other mesh network nodes.

At a decision-making block 445, processing logic performing method 400 may identify the types of various devices that have transmitted the first signal and the second signal and determine if there are proxy devices among the responding devices. For example, the processing logic may determine that the first signal and/or the second signal are proxy node announcement signals. Responsive to receiving such signals, the processing logic may identify a target device that is to be used as a proxy device to connect the end device to the mesh network. For example, the first data may include characteristics of the first device and the second data may include characteristics of the second device. In some implementations, the characteristics of a respective device may include at least some of: a type of the respective device; a power mode of the respective device; a current network load of the respective device; a transmission power indicator for the respective device; a location of the respective device; etc. In some implementations, the first data may also include a first time of arrival of the first signal and the second data may include a second time of arrival of the second signal. Accordingly, at block 450, method 400 may continue with the processing logic comparing the characteristics of the first device to the characteristics of the second device. In some implementations, comparing the characteristics of the first device to the characteristics of the second device may include determining an earlier of the first time of arrival and the second time of arrival.

At block 452, method 400 may continue with generating a second message, which may be a message to be transmitted to the target device, the target device determined based on the comparison of the characteristics of the first device and the second device. The second message may be generated by CPU 250, processed by Link Layer 230 and PHY 220, and transmitted to the first device. At block 454, processing device performing method 400 may use the second message to establish a wireless connection between the end device and the first device. In some implementations, the established wireless connection is a Generic Attribute Profile (GATT) proxy wireless connection.

If, at the decision-making block 445, it is determined that none of the responding devices are proxy node devices, method 400 may perform no action (block 499) with respect to the received signals. (In some implementations, the end device may then broadcast additional solicitations.)

FIG. 4B is a flow diagram of an example method 401 of establishing a connection between an end device and a printer device connected to a wireless mesh network, in accordance with some implementations. Method 401 may involve an end device running an application capable of facilitating communications with the wireless mesh network. The application may be a printing application. Method 401 may include operations of blocks 410-440, which may be performed substantially as operations of the respective blocks of method 400, as described above. Block 410 of method 401 may involve an action to initialize a connection to a printing device, an action to start a printing job, and so on.

At a decision-making block 455, the processing device performing method 401 may determine if among the first device, the second device (the third device . . . , etc.) is a printer device. If no printer devices are identified at block 455, the processing logic may perform no action (block 499) with respect to the received signals. (In some implementations, the end device may then broadcast additional solicitations.) If at least one printer device is identified at block 455, method 401 may continue, at block 460, with generating a second message (different from the second message generated at block 450 of method 400). The second message may be generated by CPU 250, processed by Link Layer 230 and PHY 220, and transmitted to the printer device. For example, the first data may identify the first device as a printer device. Based on this identification, the processing logic may use, at block 462, the second message to initiate a wireless connection with the printer device. In some implementations, the first data may include a service set identifier (SSID) of the printer device. The SSID of the printer device may be used to initiate the wireless connection. For example, the SSID of the printer device may be an identifier of the printer device in a network that is different from the mesh network, e.g., an SSID of the printer on a WLAN network.

FIG. 4C is a flow diagram of an example method 402 of an interaction of an end device and one or more location beacon devices of a wireless mesh network, in accordance with some implementations. Method 402 may be performed to identify a location of an end device using one or more location beacons of a mesh network. Method 401 may involve an end device running a navigation (e.g., an indoor navigation) application capable of determining location of the end device. Method 401 may include operations of blocks 410-440, which may be performed substantially as operations of the respective blocks of methods 400 and 401, as described above. Block 410 of method 402 may involve an action to start a navigation task (e.g., to locate a target object, to identify the current location of the end device, to chart a path for a user of the end device, and so on).

At a decision-making block 465, processing logic performing method 402 may identify the types of various devices that have transmitted the first signal and the second signal and determine if there are location beacon devices among the responding devices. If it is determined that at least some of the first device or the second device (third device, etc.) are location beacon devices, method 402 may proceed to block 470. At block 470, the processing logic may identify that the first data includes a first location of the first device and that the second data includes a second location of the second device. Based on the first location and the second location, as well as on other possible information, such as the measured received signal strength indicator (RSSI) of the first signal and/or the second signal, the processing logic may compute the location of the end device. In some implementations, the first data may include a first transmission power indicator characterizing radio transmission of the first device and the second data may include a second transmission power indicator characterizing radio transmission of the second device. The transmission power indicators may be used by the processing logic to determine the location of the end device, e.g., using triangulation methods. In some implementations, the location of the end device may be computed based on detected Angle of Arrival (AoA) and/or Angle of Departure (AoD), using fingerprinting methods (e.g., by comparing the measured RSSIs with a database of signals mapping a certain region of space), High Accuracy Distance Measurements (HADM), and/or other techniques.

The processing logic may then generate a second message that includes the determined location of the end device. In some implementations, the second message may not be generated for subsequent wireless transmissions; instead, the second message may be consumed within the end device itself. For example, at block 472, the second message may be generated by CPU 250 and provided to the application 265 on the end device (which may be a navigation application). If at the decision-making block 445 it is determined that none of the responding devices are location beacon devices, method 402 may perform no action (block 499) with respect to the received signals. (In some implementations, the end device may then broadcast additional solicitations.)

Figure 5:
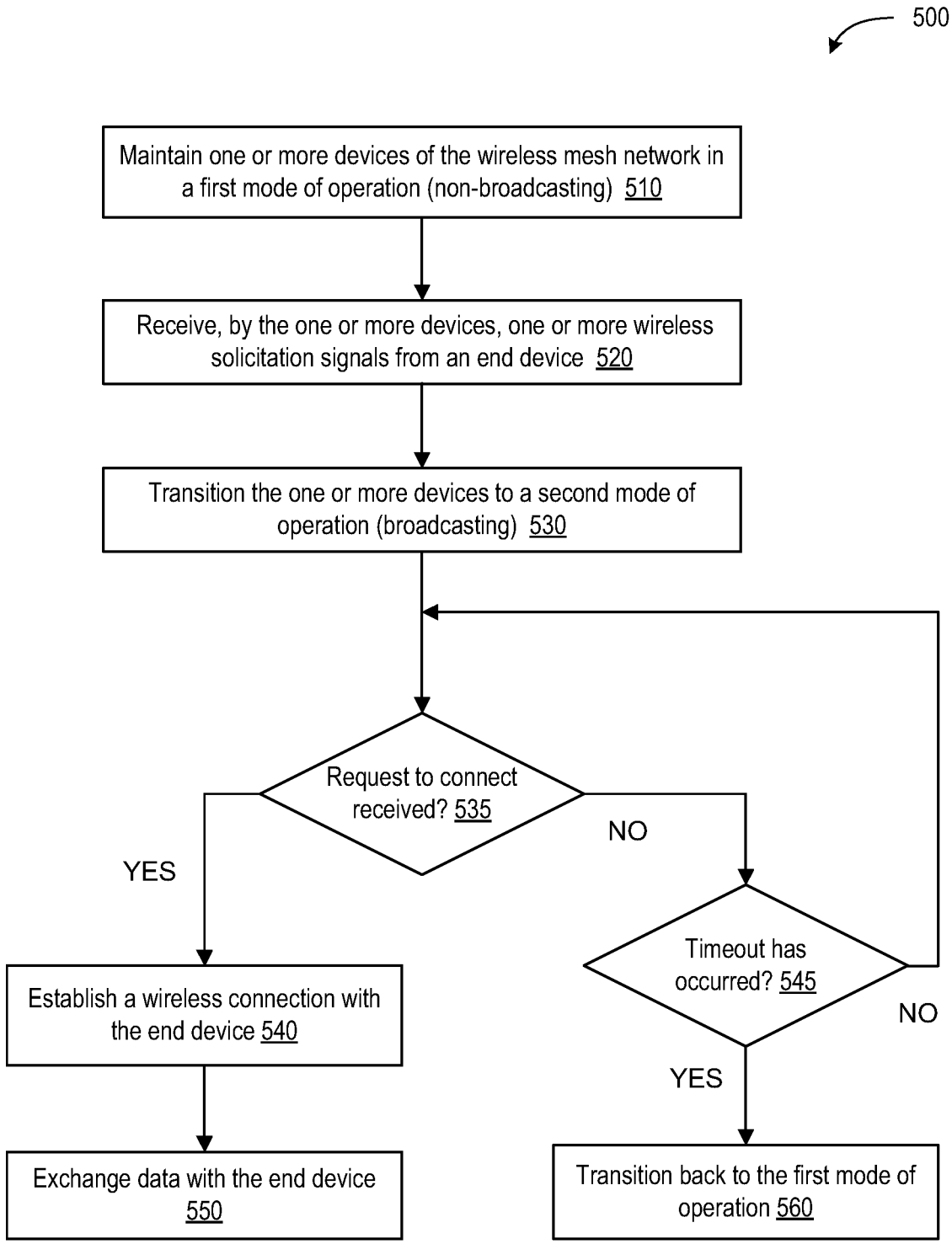
FIG. 5 is a flow diagram of an example method of operating node devices of a wireless mesh network, in accordance with some implementations.

FIG. 5 is a flow diagram of an example method 500 of operating node devices of a wireless mesh network, in accordance with some implementations. Method 500 may be performed to establish a wireless connection between a mesh network proxy device and an end device. At block 510, method 500 may include maintaining one or more devices (e.g., proxy devices, printer devices, location beacon devices, etc.) of the wireless mesh network in a first mode of operation. In the first mode of operation, the one or more devices may be configured not to broadcast advertising signals. At block 520, the one or more devices may receive one or more solicitation signals from an end device. At block 530, responsive to receiving one or more wireless solicitation signals from the end device, the one or more devices of the wireless network may be transitioned to a second mode of operation. In the second mode of operation, each of the one or more devices of the wireless network may be broadcasting (e.g., periodically) the announcement signals.

In some implementations, the broadcasting may continue until one of the following events happens: (i) each of the one or more devices broadcasts a predetermined number of announcement signals (e.g., one, two, three, etc. signals), (ii) a predetermined period for broadcasting of the announcement signals expires, (iii) a particular device of one or more devices receives a request from the end device to establish a wireless connection, and so on.

For example, if at the decision-making block 535 it is determined that a request from the end device is received by one of the devices of the wireless mesh network (e.g., by a proxy device or a printer), method 500 may continue with the respective device establishing a wireless connection with the end device. In some implementations, the wireless connection may be a GATT proxy wireless connection. Upon establishing the connection, the respective device may begin exchanging data with the end device (block 550).

If at the decision-making block 535 it is determined that no request has been received by a specific device, the device may continue to wait for a request from the end device (block 545). If no request has been received before the expiration of a timeout period, the device may transition back to the first (non-broadcasting) mode of operation. Since method 500 may involve multiple devices of a wireless mesh network, one of the devices may receive a request from the end device (and, consequently, perform operations of blocks 540 and 550) while other devices do not receive such requests (and, therefore, perform operations of blocks 545 and 560).

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

The invention claimed is:

1. A method of interaction of an end device with a wireless mesh network, the method comprising:
    responsive to an action by an application on the end device, transmitting, by the end device, one or more wireless solicitation signals generated using a wireless protocol stack of the end device, wherein the one or more wireless solicitation signals are indicative, to the wireless mesh network, of a request to establish a wireless connection to the wireless network;
    receiving, by the end device, in response to the one or more wireless solicitation signals:
        a first signal comprising a first data of a first device of the wireless mesh network; and
        a second signal comprising a second data and of a second device of the wireless mesh network; and
    generating, by a processing device of the end device, a message, based on the first data and the second data.

2. The method of claim 1, wherein the end device transmits the one or more wireless solicitation signals without receiving an advertisement signal from the first device or the second device, wherein the advertisement signal comprises a signal configured to initiate a connection between the wireless mesh network and one or more external devices.

3. The method of claim 1, wherein the first data comprises a first location of the first device and the second data comprises a second location of the second device, and wherein the generated message comprises a current location of the end device determined based, at least in part, on the first location and the second location.

4. The method of claim 3, wherein the first data further comprises a first transmission power indicator of the first device and the second data comprises a second transmission power indicator of the second device.

5. The method of claim 3, further comprising:
    providing, to the application on the end device, the generated message comprising the current location of the end device.

6. The method of claim 1, wherein the first signal and the second signal are proxy node announcement signals.

7. The method of claim 1, wherein the generated message is configured to support an establishment of a wireless connection between the end device and the first device.

8. The method of claim 7, wherein the established wireless connection is a Generic Attribute Profile (GATT) proxy wireless connection.

9. The method of claim 1, wherein the first data comprises a first time of arrival of the first signal and the second data comprises a second time of arrival of the second signal, and wherein generating the message comprises determining an earlier of the first time of arrival and the second time of arrival.

10. The method of claim 1, wherein the first data comprises characteristics of the first device and the second data comprises characteristics of the second device, and wherein generating the message comprises comparing the characteristics of the first device to the characteristics of the second device, the characteristics of a respective device comprising at least one of:
    a type of the respective device;
    a power mode of the respective device;
    a current network load of the respective device;
    a transmission power indicator for the respective device; or
    a location of the respective device.

11. The method of claim 1, wherein the first data identifies the first device as a printer device, and wherein the generated message initiates a wireless connection with the printer device.

12. The method of claim 11, wherein the first data further comprises a service set identifier (SSID) of the printer device.

13. An apparatus comprising:
a memory; and
a processing device of an end device, coupled to the memory, the processing device configured to:
responsive to an action by an application on an end device, transmit one or more wireless solicitation signals generated using a wireless protocol stack of the end device, wherein the one or more wireless solicitation signals are indicative, to the wireless mesh network, of a request to establish a wireless connection to the wireless network;
receive in response to the one or more wireless solicitation signals:
a first signal comprising a first data of a first device of a wireless mesh network; and
a second signal comprising a second data of a second device of the wireless mesh network; and
generate a message, based on the first data and the second data.

14. The apparatus of claim 13, wherein the first data comprises a first location of the first device and the second data comprises a second location of the second device, and wherein the generated message comprises a current location of the end device determined based, at least in part, on the first location and the second location.

15. The apparatus of claim 14, wherein the processing device is further to:
provide, to the application on the end device, the generated message comprising the current location of the end device.

16. The apparatus of claim 13, wherein the first signal and the second signal are proxy node announcement signals.

17. The apparatus of claim 13, wherein the generated message a wireless connection between the end device and the first device.

18. The apparatus of claim 13, wherein the first data comprises characteristics of the first device and the second data comprises characteristics of the second device, and wherein to generate the message the processing device is to compare the characteristics of the first device to the characteristics of the second device, the characteristics of a respective device comprising at least one of:
a type of the respective device;
a power mode of the respective device;
a current network load of the respective device;
a transmission power indicator for the respective device; or
a location of the respective device.

19. The apparatus of claim 13, wherein the first data identifies the first device as a printer device, and wherein the generated message initiates a wireless connection with the printer device.

20. A system comprising:
one or more antennas;
a wireless controller of an end device, the wireless controller configured to:
responsive to an action by an application on the end device, transmit, using the one or more and antennas, one or more wireless solicitation signals generated using a wireless protocol stack of the end device, wherein the one or more wireless solicitation signals are indicative, to the wireless mesh network, of a request to establish a wireless connection to the wireless network; and
receive, using the one or more antennas:
a first signal comprising a first data and transmitted by a first device of a wireless mesh network in response to the first device receiving the one or more wireless solicitation signals; and
a second signal comprising a second data and transmitted by a second device of the wireless mesh network in response to the second device receiving the one or more wireless solicitation signals; and
a processing device to:
generate a message, based on the first data and the second data.

* * * * *